(12) United States Patent
Soma et al.

(10) Patent No.: US 9,461,708 B2
(45) Date of Patent: Oct. 4, 2016

(54) POWER SUPPLY CONTROL DEVICE, METHOD OF CONTROLLING THE SAME, AND POWER SUPPLY CONTROL SYSTEM

(75) Inventors: Isao Soma, Saitama (JP); Kazuyoshi Takemura, Tokyo (JP); Takanori Washiro, Kanagawa (JP)

(73) Assignee: Sony Corporation, Minato-ku, Tokyo (JP)

( * ) Notice: Subject to any disclaimer, the term of this patent is extended or adjusted under 35 U.S.C. 154(b) by 185 days.

(21) Appl. No.: 14/113,735

(22) PCT Filed: May 1, 2012

(86) PCT No.: PCT/JP2012/061527
§ 371 (c)(1),
(2), (4) Date: Oct. 24, 2013

(87) PCT Pub. No.: WO2012/157445
PCT Pub. Date: Nov. 22, 2012

(65) Prior Publication Data
US 2014/0044200 A1  Feb. 13, 2014

(30) Foreign Application Priority Data

May 13, 2011  (JP) .................................. 2011-108120

(51) Int. Cl.
  H02J 3/34    (2006.01)
  H04B 3/54    (2006.01)
(52) U.S. Cl.
  CPC ....... H04B 3/546 (2013.01); H04B 2203/5433 (2013.01); Y02B 90/244 (2013.01); Y04S 20/327 (2013.01)
(58) Field of Classification Search
  CPC ................. H04B 5/0081; H04B 3/54; H04B 2203/5416
  USPC .......................................... 307/1–3; 375/257
  See application file for complete search history.

(56) References Cited

U.S. PATENT DOCUMENTS

2002/0000793 A1\* 1/2002 Hanaki ......................... 323/234
2003/0156014 A1\* 8/2003 Kodama .................. H04B 3/54
                                                              375/258

(Continued)

FOREIGN PATENT DOCUMENTS

JP  2001-028093  1/2001
JP  2004-030147  1/2004

(Continued)

*Primary Examiner* — Carlos Amaya
*Assistant Examiner* — Alfonso Perez Borroto
(74) *Attorney, Agent, or Firm* — Chip Law Group

(57) ABSTRACT

A power control server outputs power through a power line, outputs a high-frequency signal and communicates with an electronic device to which the power is output, through the power line, and reads out device information including at least identification information that identifies the electronic device, obtains user information related to a user who uses the electronic device, and transmits the obtained user information and the read out device information to an information management server. The information management server receives the user information and the device information transmitted from the power control server, and performs user registration related to the electronic device identified by the identification information included in the device information, based on the received user information. The present technology can be applied to a power supply control system that supplies the power to an electronic device, for example.

19 Claims, 14 Drawing Sheets

(56) References Cited

U.S. PATENT DOCUMENTS

| | | | |
|---|---|---|---|
| 2006/0145535 A1* | 7/2006 | Kaneko | 307/1 |
| 2010/0079011 A1* | 4/2010 | Hyde | H02J 17/00 307/149 |
| 2010/0109443 A1* | 5/2010 | Cook | H01Q 1/225 307/104 |
| 2010/0285695 A1* | 11/2010 | Ueno | H01R 13/642 439/639 |
| 2011/0204851 A1* | 8/2011 | Manotas, Jr. | 320/128 |
| 2011/0289336 A1* | 11/2011 | Yu | H02J 9/04 713/340 |

FOREIGN PATENT DOCUMENTS

| | | |
|---|---|---|
| JP | 2004-104863 | 4/2004 |
| JP | 2005-026740 | 1/2005 |
| JP | 2007-257328 | 10/2007 |
| JP | 2008-153852 | 7/2008 |

* cited by examiner

*FIG. 6*

PRODUCT CATEGORY
PRODUCT NAME
MANUFACTURER
MANUFACTURE SERIAL NUMBER
DISTRIBUTOR
TERM OF GUARANTEE
START DATE OF USE
PRODUCT WEBSITE URL
REGISTRATION USER ID
•
•
•

DEVICE INFORMATION

FIG. 8

NAME
ADDRESS
TELEPHONE NUMBER
MOBILE PHONE NUMBER
MAIL ADDRESS
MOBILE PHONE MAIL ADDRESS
•
•
•

USER INFORMATION

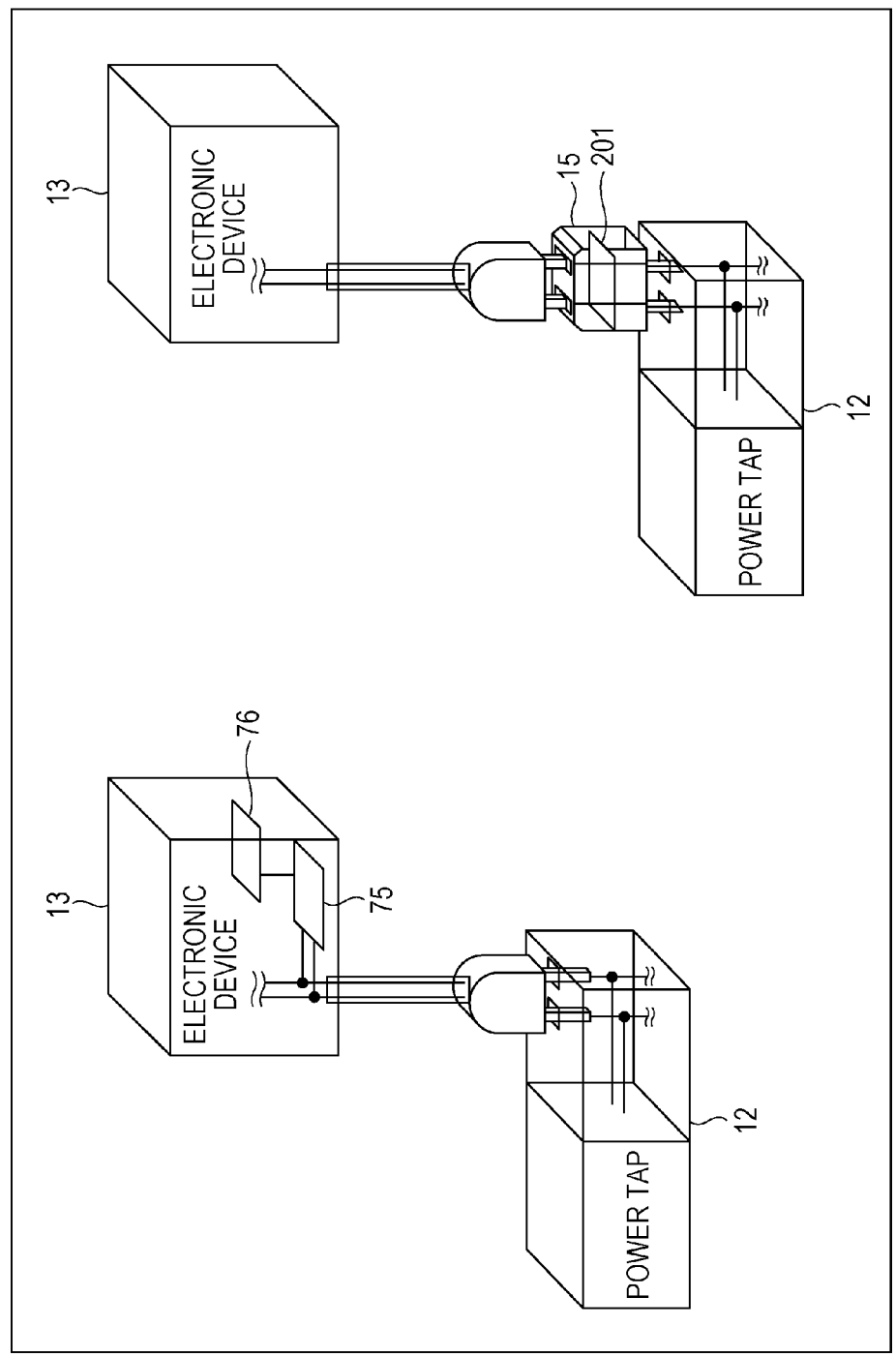

POWER SUPPLY CONTROL DEVICE, METHOD OF CONTROLLING THE SAME, AND POWER SUPPLY CONTROL SYSTEM

CROSS REFERENCES TO RELATED APPLICATIONS

The present application is a national stage of International Application No. PCT/JP2012/061527 filed on May 1, 2012 and claims priority to Japanese Patent Application No. 2011-108120 filed on May 13, 2011, the disclosure of which is incorporated herein by reference.

BACKGROUND

The present technology relates to a power supply control device, a method of controlling the same, and a power supply control system, and especially relates to a power supply control device, a method of controlling the same, and a power supply control system capable of easily performing user registration.

To validate a product guarantee of a product when the product such as a home appliance is purchased, typically, the personal information is written down on an enclosed guarantee and is sent by mail and the like.

Further, a method of creating and registering a product guarantee by accessing a site for creating and registering a guarantee from a mobile terminal device according to access information of a barcode or an IC tag attached to the product has been proposed (for example, see Patent Document 1).

CITATION LIST

Patent Document

Patent Document 1: JP 2004-00147 A

SUMMARY

Problems to be Solved by the Invention

However, in the existing technology, it is necessary to write down the personal, information on the guarantee and send it, or to access the site for creating and registering the guarantee to perform registration for each newly purchased product. In any case, the user is forced to do troublesome work. Therefore, there is a demand to perform user registration such as registration of a guarantee in the absence of the troublesome work.

The present technology has been made in view of the foregoing, and enables easy user registration.

Solutions to Problems

A power supply control device according to a first aspect of the present technology includes: a power source supply unit configured to output power through a power line; a communication unit configured to output a high-frequency signal and to communicate with an electronic device to which the power is output, through the power line, to read out device information including at least identification information identifying the electronic device; a control unit configured to obtain user information related to a user who uses the electronic device; and a transmission unit configured to transmit the obtained user information and the read out device information to an information management device configured to manage the device information.

The power supply control device further includes a recording unit configured to record the user information, wherein, when the user information has not been recorded in the recording unit, the control unit obtains the user information input by the user, and when the user information has been recorded in the recording unit, the control unit obtains the recorded user information.

The control unit, performs authentication processing of the electronic device based on the identification information included in the read out device information, and controls the power to be output to the electronic device through the power line in accordance with a result of the authentication processing.

The communication unit outputs the high-frequency signal and to perform communication through the power line to obtain use history information related to a use status of the electronic device, and the transmission unit transmits the obtained use history information and the device information to the information management device.

The communication unit obtains a power used time and a used power amount of the electronic device as the use history information.

The electronic device is provided with a storage element configured to output the stored device information to the power supply control device through the power line by applying load modulation to the high-frequency signal input through the power line.

A control method according to the first aspect of the present technology corresponds to the power supply control device according to the first aspect of the present technology.

The power supply control and the device control method according to the first aspect of the present technology include the steps of: outputting power through a power line; outputting a high-frequency signal and communicating with an electronic device to which the power is output, through the power line, and reading out device information including at least identification information identifying the electronic device; obtaining user information related to a user who uses the electronic device; and transmitting the obtained user information and the read out device information to an information management device configured to manage the device information.

A power supply control system according to a second aspect of the present technology includes: an electronic device; a power supply control device; an information management device; and a terminal, device, wherein the power supply control device includes a power source supply unit configured to output power through a power line, a communication unit configured to output a high-frequency signal and to communicate with the electronic device to which the power is output, through the power line, and to read out device information including at least identification information identifying the electronic device, a control unit configured to obtain user information related to a user who uses the electronic device, and a transmission unit configured to transmit the obtained user information and the read out device information to the information management device, and the information management device includes a reception unit configured to receive the user information and the device information transmitted from the power supply control device, and a processing unit configured to perform user registration processing related to the electronic device identified by the identification information included in the device information based on the received user information.

The information management device further includes a recording unit configured to record the received device information, and the processing unit performs processing of providing the recorded device information in response to a request from the terminal device.

The communication unit outputs the high-frequency signal and perform communication through, the power line to obtain use history information related to a use status of the electronic device, the transmission unit transmits the obtained use history information and the device information to the information management device, the reception unit receives the use history information and the device information transmitted from the power supply control device, and the recording unit records the received use history information and the device information in association with each other.

The communication unit obtains a power used time and a used power amount of the electronic device as the use history information.

The processing unit performs processing of providing the recorded use history information in response to a request from the terminal device.

The electronic device is provided with a storage element configured to apply load modulation to the high-frequency signal input through the power line to output the stored device information to the power supply control device through the Power line.

An electronic device, a power supply control device, an information management device, and a terminal device may be independent devices or may be internal, blocks that configure a single device.

In a power supply control system of a second aspect of the present technology, a power supply control device outputs power through a power line, outputs a high-frequency signal and communicates with an electronic device to which the power is output, through the power line, and reads out device information including at least identification information that identifies the electronic device, obtains user information related to a user who uses the electronic device, and transmits the obtained user information and the read out device information to an information management device. The information management device receives the user information and the device information transmitted from the power supply control device, and performs user registration processing related to the electronic device identified by the identification information included in the device information, based on the received user information.

Effects of the Invention

According to one aspect of the present technology, uses registration can be easily performed.

Additional features and advantages are described herein, and will be apparent from the following Detailed Description and the figures.

BRIEF DESCRIPTION OF THE FIGURES

FIG. 6 is a diagram illustrating an example of device information.

FIG. 8 is a diagram illustrating an example of user information.

FIG. 14 is a diagram illustrating a connection example using a power plug adapter.

DETAILED DESCRIPTION

Hereinafter, embodiments of the present technology will be described with reference to the drawings.

[A Configuration of a Power Supply Control System]

Figure 1:
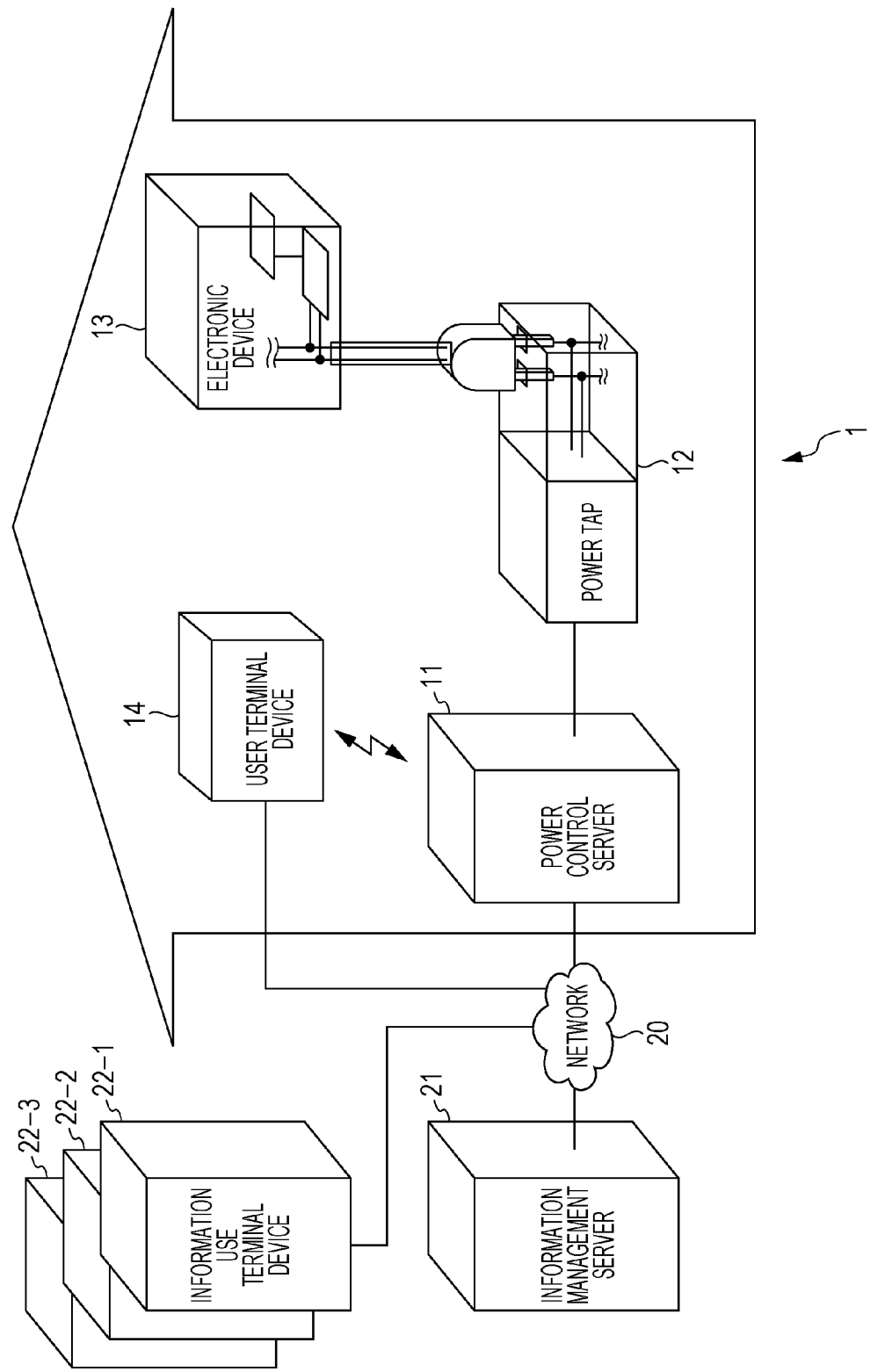
FIG. 1 is a diagram illustrating a configuration example of a power supply control system.

FIG. 1 is a diagram illustrating a configuration example of a power supply control system.

As illustrated in FIG. 1, a power supply control system 1 includes a power control server 11, a power tap 12, an electronic device 13, a user terminal device 14, an information management server 21, and information use terminal devices 22-1 to 22-3.

The power control server 11 through the user terminal device 14 are installed, in a user home, for example. Further, the information management server 21 and the information use terminal devices 22-1 to 22-3 are installed in a facility of a business operator related to the electronic device 13, for example, and are connected with the power control server 11 through a network 20 and are capable of mutually performing communication.

The power control server 11 is connected with an external power source, and supplies the power from the external power source to the electronic device 13 connected to the power tap 12 through a power line. In addition, the power control server 11 performs communication with the electronic device 13 through a power line with a high-frequency signal (alternating-current signal) superimposed on the power line. The power control server 11 accumulates information obtained from the electronic device 13.

In addition, the power control server 11 is connected with the information management server 21 through the network 20, and transmits information obtained from the electronic device 13 and the user terminal device 14 to the information management server 21.

The electronic device 13 is connected with the power tap 12, and performs processing and operations in accordance with various functions with the power supplied from the power tap 12 through the power line. In addition, the electronic device 13 is activated with the power from the high-frequency signal superimposed on the power line and transmitted by the power control server 11 and received through the power line, and performs communication with the power control server 11 through the power line.

Note that details of the communication through the power line performed between the power control server 11 and the electronic device 13 with the high-frequency signal having a higher frequency than the frequency of the power will be described below.

The user terminal device 14 is an information terminal device such as a personal computer, a tablet PC, and a smartphone, and performs processing and operations in accordance with user operations. The user terminal device 14 transmits information obtained by predetermined processing and transmits information accumulated in the power control server 11 by performing wired or wireless communication with the power control server 11. In addition, the user terminal device 14 is connected to the information management server 21 through the network 20, and receives various types of information.

The information management server 21 is installed in a facility of a business operator who provides a service related to the electronic device 13, for example, and receives and accumulates the information transmitted from the power control server 11 through the network 20. In addition, the information management server 21 provides the accumulated information in response so a request from the user terminal device 14 or the information use terminal devices 22-1 to 22-3.

The information use terminal devices 22-1 to 22-3 are installed in a facility of a business operator who uses information, such as a manufacturer and a distributor (for example, a shop) of the electronic device 13, and are operated by its employees and the like. The information use terminal devices 22-1 to 22-3 are connected to the information management server 21 through the network 20, and receive various types of information.

Note that, in the following description, when the information use terminal devices 22-1 to 22-3 need not be distinguished from one another, the information use terminal devices 22-1 to 22-3 are simply referred to as an information use terminal device 22 and description will be given.

The power supply control system 1 is configured as described above.

[A Configuration of Devices that Configure the Power Supply Control System 1]

Figure 2:
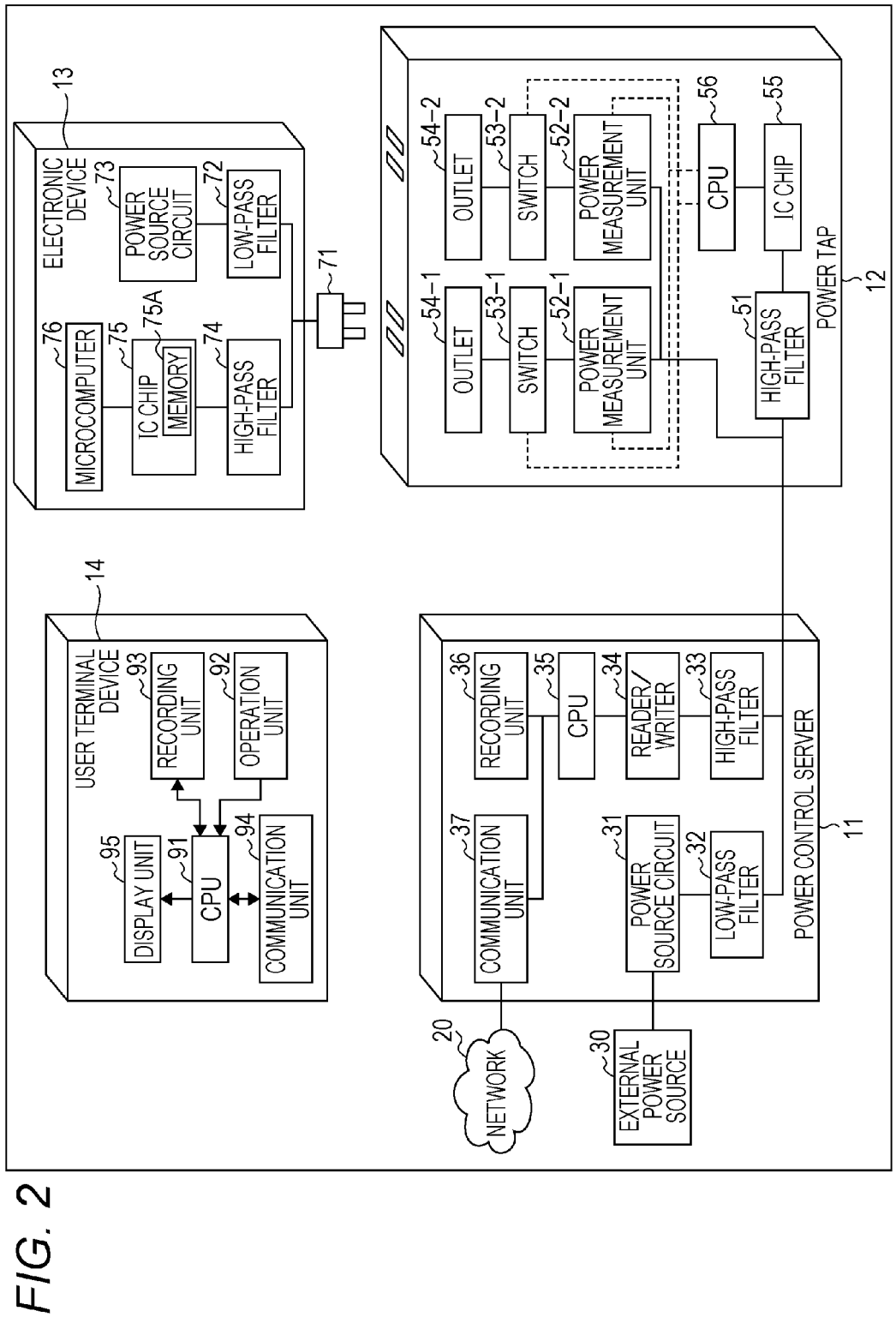
FIG. 2 is a diagram illustrating a configuration example of units.
Figure 3:
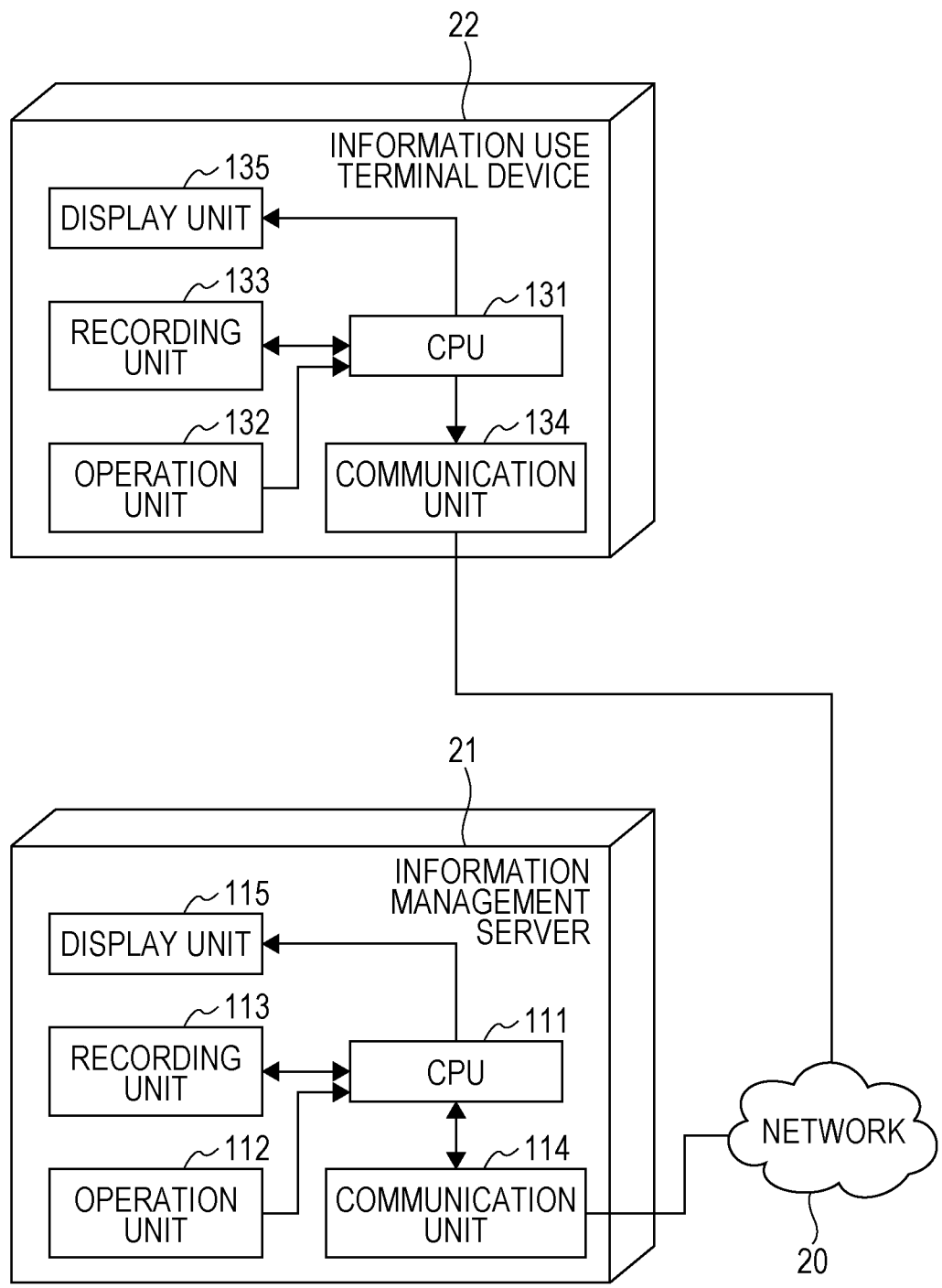
FIG. 3 is a diagram illustrating a configuration example of units.

FIGS. 2 and 3 are diagrams illustrating configuration examples of devices that configure the power supply control system 1 of FIG. 1.

First, configurations of the power control server 11, the power tap 12, the electronic device 13, and the user terminal device 14 arranged in a user home will be described with reference to FIG. 2.

The power control server 11 is configured from a power source circuit 31, a low-pass filter 32, a high-pass filter 33, a reader/writer 34, a CPU 35, a recording unit 36, and a communication unit 37.

The power source circuit 31 supplies the power (alternating-current power) from an external power source 30 to the power tap 12 through the lowpass filter 32.

The low-pass filter 32 is arranged on the power line between the power source circuit 31 and the power tap 12, and enables power supply to the power tap 12 to which the electronic device 13 is connected. In addition, the low-pass filter 32 interrupts the high-frequency signal generated by the reader/writer 34 and transmitted through the power line.

The high-pass filter 33 allows the high-frequency signal generated by the reader/writer 34 to pass through, and transmits the high-frequency signal to the power tap 12 through the power line. In addition, the high-pass filter 33 interrupts the power supplied through the power line.

The reader/writer 34 performs communication with the electronic device 13 through the power line according to control of the CPU 35.

To be specific, primarily, the reader/writer 34 is electromagnetically coupled with an IC chip, and delivers the high-frequency signal with the IC chip. That is, the reader/writer 34 is provided to read/write information in accordance with the specification of the IC chip. However, in the present embodiment, the high-frequency signal (alternating-current signal) is delivered through the power line. That is, the high-frequency signal primarily delivered through a coil and the like within the reader/writer 34 is superimposed on the power line through the high-pass filter, and the communication with the IC chip is performed through the power line.

The CPU 35 executes a control program recorded in the recording unit 36 to perform authentication processing of the electronic device 13 and control of operations of the units of the power control server 11. In addition, the CPU 35 records, in the recording unit 36, information obtained through the communication with the electronic device 13 through the power line.

The communication unit 37 performs communication with the user terminal device 14 according to control of the CPU 35, and supplies information obtained by the communication with the user terminal device 14 to the CPU 35. The CPU 35 records, in the recording unit 36, the information obtained by the communication with the user terminal device 14.

In addition, the communication unit 37 transmits the information recorded in the recording unit 36 to the information management server 21 through the network 20 according to control of the CPU 35.

The power control server 11 is configured as described above.

The power tap 12 is configured from a high-pass filter 51, a power measurement unit 52-1, a power measurement unit 52-2, a switch 53-1, a switch 53-2, an outlet 54-1, an outlet 54-2, an IC chip 55, and a CPU 56.

The high-pass filter 51 allows the high-frequency signal generated by the reader/writer 34 of the power control server 11 to pass through and to be transmitted to the IC chip 55 through the power line. In addition, the high-pass filter 51 interrupts the power supplied from the power line.

The power measurement unit 52-1 measures the power supplied through the power line, and supplies a measurement result to the CPU 56 according to control of the CPU 56. In addition, the power measurement unit 52-2 measures the power in a similar manner to the power measurement unit 52-1.

The switch 53-1 is arranged on the power line between the power measurement unit 52-1 and the outlet 54-1, and performs a switching operation according to control of the CPU 56. That is, when the switch 53-1 goes into an ON state (energized state), the power from the power control server 11 is supplied to the outlet 54-1 through the power line. Meanwhile, when the switch 53-1 goes into an OFF state (power-interrupted state), no power is supplied to the outlet 54-1. The switch 53-2 controls the power to be supplied to the outlet 54-2 by performing a switching operation in a similar manner to the switch 53-1.

A plug 71 of the electronic device 13 is connected to the outlet 54-1 or the outlet 54-2, and the power is supplied to the electronic device 13 through the power line. In addition, the outlet 54-1 and the outlet 54-2 allows the high-frequency signal generated by the reader/writer 34 to be transmitted to the electronic device 13 connected through the power line.

The IC chip 55 rectifies a voltage obtained from the high-frequency signal superimposed on the power line, obtains a command corresponding to the high-frequency signal transmitted from the reader/writer 34 and supplies the command to the CPU 56 with the power obtained as a result of the rectification.

The CPU 56 performs processing in accordance with the command supplied from the IC chip 55. To be specific, the CPU 56 controls the switch 53-1 in accordance with the command from the IC chip 55 so that the switch 53-1 goes into the ON state or the OFF state. In addition, the CPU 56 obtains the measurement result of the power measured by the power measurement unit 52-1, and returns the measurement result to the reader/writer 34 in accordance with the command from the IC chip 55.

Note that, in the following description, when the power measurement unit 52-1 and the power measurement unit 52-2 need not be distinguished from one another, they are referred to as a power measurement unit 52, when the switch 53-1 and the switch 53-2 need not be distinguished from one another, they are referred to as a switch 53, and when the outlet 54-1 and the outlet 54-2 need not be distinguished from one another, they are referred to as an outlet 54.

The power tap 12 is configured as described above.

The electronic device 13 is configured from the plug 71, a low-pass filter 72, a power source circuit 73, a high-pass filter 74, an IC chip 75, and a microcomputer 76.

The plug 71 is connected to the outlet 54 of the power tap 12. The low-pass filter 72 is arranged on the power line between the plug 71 and the power source circuit 73, and enables power supply to the power source circuit 73 through the power line.

The power source circuit 73 converts the power supplied through the power line from the alternating-current power to a direct-current power, and supplies the direct-current power to each unit of the electronic device 13. Accordingly, each unit of the electronic device 13 becomes operable.

The high-pass filter 74 is arranged on the power line between the plug 71 and the IC chip 75, and enables delivery of the high-frequency signal between the IC chip 75 and the reader/writer 34 of the power control server 11 through the Power line. In addition, the high-pass filter 74 prevents the power supplied through the power line from being input to the IC chip 75.

The IC chip 75 rectifies the power obtained from the high-frequency signal superimposed on the power line, and performs processing in accordance a command corresponding to the high-frequency signal transmitted from the reader/writer 34 with the power obtained as a result of the rectification. The IC chip 75 applies load modulation to a processing result, and transmits the modulated result to the reader/writer 34 through the power line.

In addition, the IC chip 75 is a storage element, and includes a memory 75A. The IC chip 75 can store information and processing result transmitted from the reader/writer 34, and can supply the information to the microcomputer 76.

Note that the IC chip 75 can be configured from an electronic tag such as an IC tag based on various specifications. For example, any tag based on the specifications such as FeliCa a near field communication (NFC), a radio frequency identification (RFID), and Mifare (all are trademarks), and any other electronic tags having unique configurations that are not based on the above specifications can be prepared. It is favorable that the IC chip 75 includes a function to read and output at least internally stored information and a function to store supplied information, with the high-frequency signal. Further, any of a passive type and an active type IC chips may be employed.

The microcomputer 76 performs various types of processing based on information supplied from the IC chip 75. In addition, the microcomputer 76 can write various types of information in the memory 75A of the IC chip 75.

The electronic device 13 is configured as described above.

The use terminal device 14 is configured from a CPU 91, an operation unit 92, a recording unit 93, a communication unit 94, and a display unit 95.

The CPU 91 executes a control program recorded in the recording unit 93 to control operations of units of the user terminal device 14.

The operation unit 92 supplies an operation signal in accordance with an operation of the user to the CPU 91. The CPU 91 performs processing in accordance with the operation signal supplied from the operation unit 92.

The communication unit 94 performs communication with the information management server 21 through the power control server 11 or the network 20 according to control of the CPU 91, and supplies information obtained by the communication to the CPU 91. The CPU 91 records the information supplied from the communication unit 94 in the recording unit 93, and displays the information in the display unit 95.

The user terminal device 14 is configured as described above.

Next, configurations of the information management server 21 and the information use terminal device 22 arranged outside the user home will be described with reference to FIG. 3.

The information management server 21 is configured from a CPU 111, an operation unit 112, a recording unit 113, a communication unit 114, and a display unit 115.

The CPU 111 executes a control program recorded in the recording unit 113 to control operations of units of the information management server 21.

The operation unit 112 supplies an operation signal in accordance with an operation of the user to the CPU 111. The CPU 111 performs processing in accordance with the operation signal supplied from the operation unit 112.

The communication unit 114 performs communication with the user terminal device 14 or the information use terminal device 22 through the network 20, and supplies information obtained by the communication to the CPU 111 according to control of the CPU 111. The CPU 111 records the information supplied from the communication unit 114 in the recording unit 113, and displays the information in the display unit 115.

The information management server 21 is configured as described above.

The information use terminal device 22 is configured from a CPU 131, an operation unit 132, a recording unit 133, a communication unit 134, and a display unit 135.

The CPU 131 executes a control program recorded in the recording unit 133 to control operations of units of the information use terminal device 22.

The operation unit 132 supplies an operation signal in accordance with an operation of the user to the CPU 131. The CPU 131 performs processing in accordance with the operation signal supplied form the operation unit 132.

The communication unit 134 performs communication with the information management server 21 through the network 20, and supplies information obtained by the communication to the CPU 131 according to control of the CPU 131. The CPU 131 records, in the recording unit 133, the information supplied from the communication unit 134, and displays the information in the display unit 135.

The information use terminal device 22 is configured as described above.

[A Flow of Electronic Device Connection Processing]

Next, electronic device connection processing performed when the electronic device 13 is connected to the power tap 12 will be described with reference to the flowchart of FIG. 4.

When the plug 71 of the electronic device 13 is connected to the outlet 54 of the power tap 12 ("Yes" of step S11), the electronic device connection processing is started, and in step S12, device authentication processing is performed.

In the device authentication processing, authentication processing of the connected electronic device 13 is performed by the power control server 11. Note that details of the device authentication processing will be described with reference to the flowchart of FIG. 5.

When the connected electronic device 13 is authenticated as a valid electronic device by the device authentication processing ("Yes" in step S13), information related to the electronic device (hereinafter, referred to as device information) is obtained from the electronic device 13, and the processing proceeds to step S14.

Meanwhile, when the connected electronic device 13 is authenticated as an invalid electronic device ("No" in step S13), the processing proceeds to step S22. In step S22, the power control server 11 performs, with respect to the user terminal device 14, connection confirmation of whether connection of the electronic device that has not been authenticated is allowed. When the connection of the unauthenticated electronic device is allowed by the user who operates the user terminal device 14 ("Yes" in step S23), the processing proceeds to step S14. In addition, when the connection of the unauthenticated electronic device is not allowed by the user ("No" in step S23), subsequent processing is not performed, and the electronic device connection processing of FIG. 4 ends.

In step S14, the power control server 11 determines whether the electronic device 13 that has been authenticated as a valid electronic device is a newly connected electronic device. In step S14, when it is determined that the electronic device 13 is a newly connected electronic device, it is necessary to perform user registration, and therefore, the processing proceeds so step S15.

In step S15, the power control server 11 determines whether information related, to the user (hereinafter, referred to as user information) is recorded. In step S15, when it is determined that the user information is not recorded, the processing proceeds to step S16. Then, in step S16, initial user registration processing is performed.

In the initial user registration processing, she user information is input through the user terminal device 14, and the input user information is recorded in the power control server 11. Further, the power control server 11 transmits the user information and the device information to the information management server 21 through the network 20.

Then, the information management server 21 receives the user information and the device information, and performs the user registration processing based on the information. As the user registration processing, registration of a guarantee, user registration of a manufacturer and a shop, and the like are performed. Note that details of the initial user registration processing will be described with reference to the flowchart of FIG. 7.

Meanwhile, in step S15, when it is determined that the user information has been already recorded, the processing proceeds to step S17. Then, in step S17, second and subsequent user registration processing is performed.

In the second and subsequent user registration processing, the power control server 11 obtains the user information recorded by the initial user registration processing, and transmits the user information and the device information to the information management server 21 through the network 20.

Then, the information management server 21 receives the user information and the device information, and the user registration processing based on the information is performed. Note that details of the second and subsequent user registration processing will be described with reference to the flowchart of FIG. 9.

When the processing of step S16 or step S17 is performed, and the user registration of the newly connected electronic device is completed, the processing proceeds to step S18. Further, in step S14, when it is determined that the electronic device 13 is not a newly connected electronic device, the user registration has been already performed. Therefore, the processing from steps S15 to S17 is skipped, and proceeds to step S18.

In step S18, use history accumulation processing is performed.

In the use history accumulation processing, the power control server 11 obtains information related to a use status (hereinafter, referred to as use history information) of the connected electronic device 13, and transmits the use history information and the device information to the information management server 21 through the network 20.

Then, the information management server 21 receives the use history information and the device information, and accumulates the use history information of each electronic device 13. Note that details of the use history accumulation processing will be described with reference to the flowchart of FIG. 10.

The use history accumulation processing is continued until use of the electronic device 13 is determined to be terminated, such as the electronic device 13 being removed from the power tap 12 ("No" in step S19).

Then, when it is determined that the use of the electronic device 13 is terminated ("Yes" in snip 819), the processing proceeds to step S20. In step S20, whether information accumulated in the information management server 21 including the user information, the device information, and the use history information is used is determined. In step S20, when it is determined that the information is used, the processing proceeds to step S21.

In step S21, information use processing is performed.

In the information use processing, the information management server 21 provides the information including the user information, the device information, and the use history information in response to a request from the user terminal device 14 or the information use terminal device 22. Note that details of the information use processing will be described with reference to the flowcharts of FIGS. 12 and 13.

Figure 4:
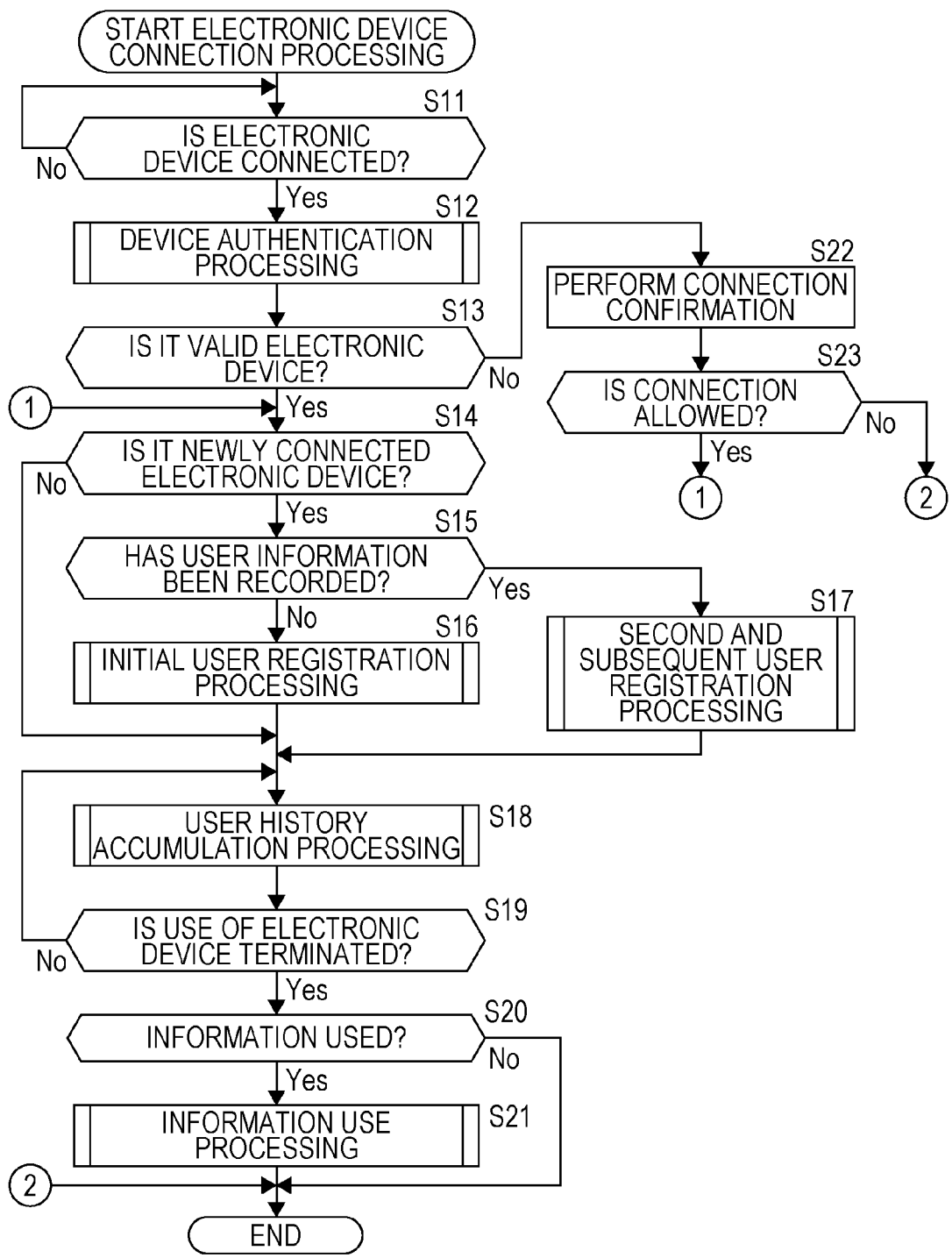
FIG. 4 is a flowchart, describing electronic device connection processing.

Then, when the information use processing of step S20 ends or it is determined that the information is not used ("No" in step S20), the electronic device connection processing of FIG. 4 is terminated.

As described above, in the electronic device connection processing, with a single operation of the insertion of the plug 71 of the electronic device 13 to the outlet 54, the procedure after purchase of the electronic device 13, such as the registration of a guarantee, is performed. In addition, while the plug 71 of the electronic device 13 is inserted to the outlet 54, the use history information of the electronic device 13 is accumulated. Therefore, the information can be shared with other terminal devices.

[A Flow of the Device Authentication Processing]

Next, details of the device authentication processing corresponding to step S12 of FIG. 4 will be described with reference to the flowchart of FIG. 5.

In the power control server 11, when the electronic device 13 is connected ("Yes" in step S11 of FIG. 4) the device authentication processing is started.

In step S31, the CPU 35 generates a device-information information read command. To be specific, the device information including at least identification information that identifies the own device is stored in the memory 75A of the IC chip 75 of the electronic device 13, and a command for reading the information is generated.

In step S32, the reader/writer 34 modulates a high-frequency signal as the high-frequency signal in accordance with the command. To be specific, the reader/writer 34 applies frequency modulation to a carrier having a frequency of 13.56 MHz as the high-frequency signal in accordance with the command generated in step S31. In step S33, the reader/writer 34 outputs the high-frequency signal through the power line.

The high-frequency signal output from the power control server 11 is transmitted to the electronic device 13 connected to the power tap 12 through the power line. Note that, when an alternating current output from the external power source 30 flows in the power line, the high-frequency signal is superimposed on the alternating current.

Then, in the electronic device 13, the IC chip 75 receives the high-frequency signal transmitted through the power line (step S51).

In step S52, the IC chip 75 executes the device-information read command using the power obtained from the received high-frequency signal, and reads out the device information stored in the memory 75A (step S53).

FIG. 6 is a diagram illustrating an example of the device information stored in the memory 75A of the IC chip 75.

As illustrated in FIG. 6, a product category, a product name, a manufacturer, a manufacture serial number, a distributor, the term of guarantee, a start data of use, and a uniform resource locator (URL) of a product website are written in the memory 75A as the device information before the sale of the product, for example. Note that information for identifying the user, such as a registration user ID, may be written.

Figure 5:
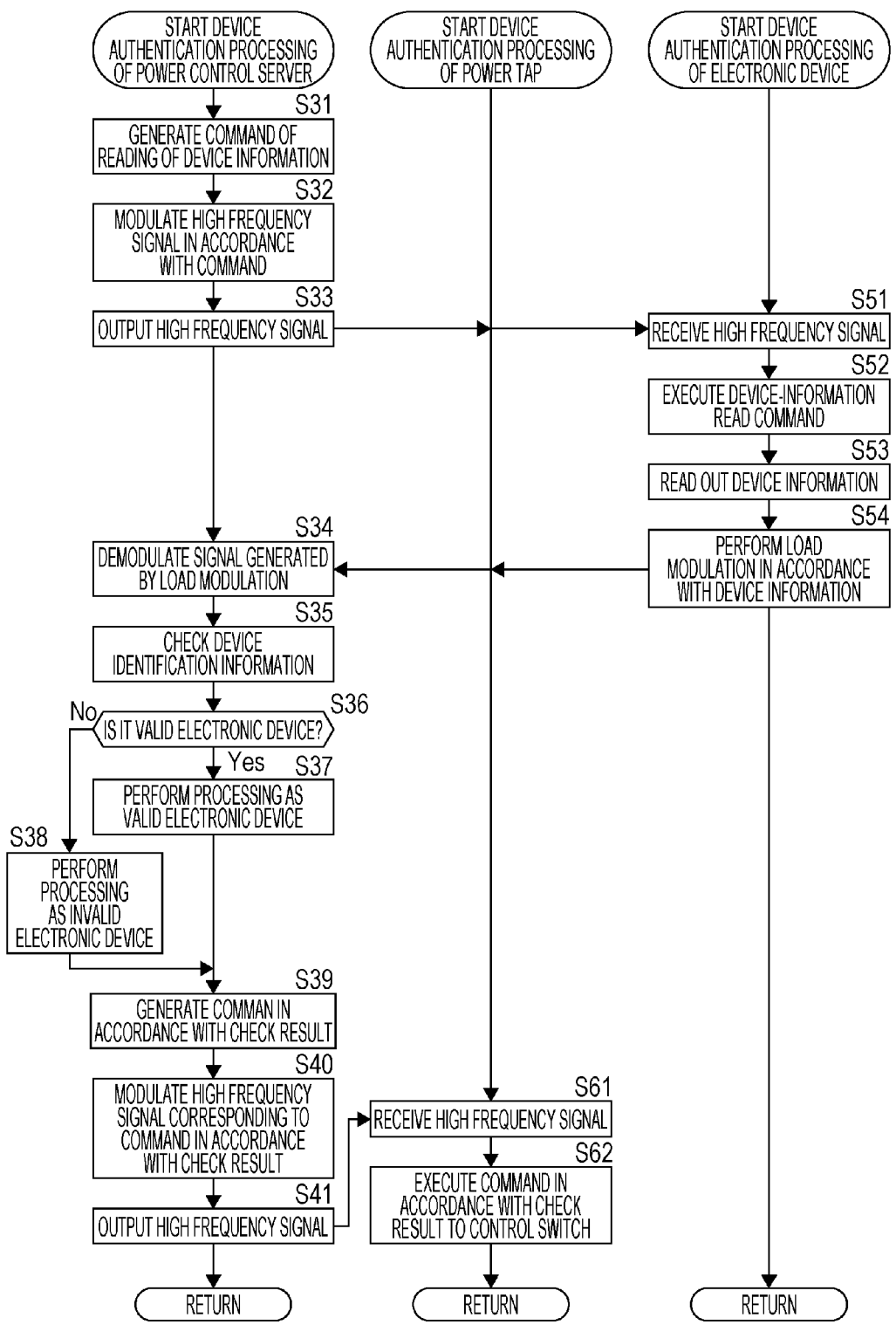
FIG. 5 is a flowchart describing details of device authentication processing.

Referring back to the flowchart of FIG. 5, in step S54, the IC chip 75 performs the load modulation in accordance with the read out device information.

The power control server 11 receives, through the power line, a signal of a reflected wave generated by the load modulation of the high-frequency signal in the IC chip 75. Then, in the power control server 11, the reader/writer 34 demodulates the signal of the reflected wave generated by the load modulation (step S34). Accordingly, the device information is read out from the electronic device 12.

In step S35, the CPU 35 checks whether the identification information (for example, the manufacture serial number of FIG. 6) included in the read out device information matches registered identification information. That is, in the power control server 11, the identification information for identifying an electronic device to which the power supply is to be allowed is registered in advance, and whether the registered identification information matches the read out identification information is determined.

In step S36, the CPU 35 determines whether the connected electronic device 13 is a valid electronic device based on a result of the check in step S35.

In step S36, when the electronic device 13 is determined to be a valid electronic device, the processing proceeds to step S37. In step S37, the CPU 35 performs processing as a valid electronic device. For example, as the processing of a valid electronic device, processing of recording the read out device information in the recording unit 36 is performed. Accordingly, the device information of FIG. 6 is recorded in the recording unit 36, for example.

Meanwhile, in step S36, the electronic device 13 is determined to be an invalid electronic device, the processing proceeds to step S38. In step S38, the CPU 35 performs processing as an invalid electronic device. For example, as the processing of an invalid electronic device, error processing in a case where the authentication is failed is performed.

When step S37 or step S38 ends, the processing proceeds to step S39. In step S39, the CPU 35 generates a command in accordance with the check result. In step S40, the reader/writer 34 modulates the high-frequency signal corresponding to the command in accordance with the check result, and outputs the modulated signal through the power line (step S41).

The high-frequency signal output from the power control server 11 is transmitted to the power tap 12 through the power line.

Then, in the power tap 12, the IC chip 55 receives the high-frequency signal transmitted through the power line (step S61.) In step S62, the CPU 56 executes the command in accordance with the check result obtained from the received high-frequency signal to control the switch 53.

For example, when a valid electronic device is connected, the CPU 56 performs control to cause the switch 53 to go into the ON state based on the command in accordance with the check result. Accordingly, the power is supplied to the connected electronic device 13. Meanwhile, when an invalid electronic device is connected, the CPU 56 performs control to cause the switch 53 to go into in an OFF state based on the command in accordance with the check result, whereby the power is not supplied to the electronic device 13.

When the processing of step S62 ends, the device authentication processing of FIG. 5 is terminated. Then, the processing returns to step S12 of FIG. 4, and step S13 and subsequent processing are performed.

As described above, in the device authentication processing, the authentication processing based on the authentication information read out from the electronic device 13 is performed, and the power is supplied only when an electronic device is determined to be a valid electronic device.

[A Flow of the User Registration Processing]

Next, details of the initial user registration processing corresponding to step S16 of FIG. 4 will be described with reference to the flowchart of FIG. 7.

Figure 7:
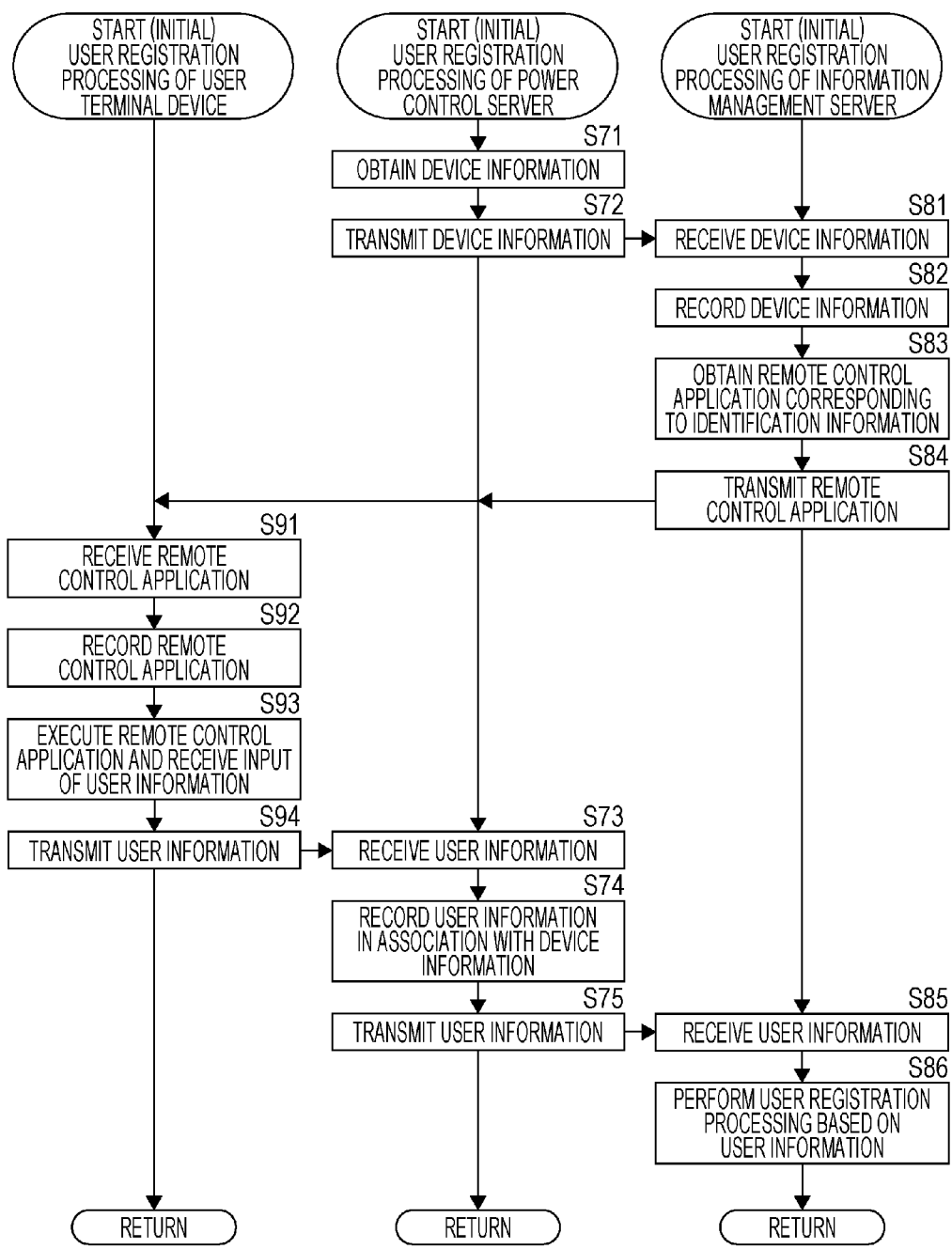
FIG. 7 is a flowchart describing details of initial user registration processing.

As described above, in a case where a valid electronic device is connected and the electronic device is a newly connected electronic device, when the user information has not been recorded in the recording unit 36 of the power control server 11, the initial, user registration processing of FIG. 7 is started.

In the power control server 11, the CPU 35 reads out and obtains the device information of the electronic device 13 recorded in the recording unit 36 (step S71). In step S72, the communication unit 37 transmits the obtained device information to the information management server 21 through the network 20 according to control of the CPU 35.

When the device information is transmitted from the power control server 11, the communication unit 114 receives the device information transmitted from the power control server 11 in the information management server 21

(step S81). In step S82, the CPU 111 records the received device information in the recording unit 113. Note that the device information can be managed for each information management server 21 by the information management server 21 transmitting the identification information for identifying the own server along with the device information.

In step S83, the CPU 111 obtains a remote control application corresponding to the identification information included in the device information.

For example, the business operator who uses information can register, as information of an electronic device that involves the business operator, the remote control application for controlling the electronic device in the recording unit 113 of the information management server 21, in advance, which is provided by the business operator who provides information. Accordingly, the CPU 111 obtains the remote control application corresponding to the connected electronic device 13 from the recording unit 113 based on the identification information, such as the manufacture serial number and the product name.

In step S84, the communication unit 114 transmits the obtained remote control application to the power control server 11 through the network 20.

When the remote control application is transmitted from the information management server 21, the power control server 11 receives the remote control application and transmits the application to the user terminal device 14. Note that, in the power control server 11, the received remote control application may be recorded in the recording unit 36.

In the user terminal device 14, the communication unit 94 receives the remote control application transmitted from the power control server 11 (step S91). In step S92, the CPU 91 records the received remote control application in the recording unit 93.

In step S93, the CPU 91 executes the remote control application recorded in the recording unit 93 to receive an input of the user information. As the user information, information related to the user registration, such as information necessary for registration of the guarantee of the electronic device 13, is input by the user operating the operation unit 92.

FIG. 8 is a diagram illustrating an example of the input user information.

As illustrated in FIG. 8, as the user information, a name, an address, a telephone number, a mobile phone number, a mail address, a mobile phone mail address, and the like are input, for example.

Referring back no the flowchart of FIG. 7, in step S94, the communication unit 94 transmits the input user information to the power control server 11.

When the user information is transmitted from the user terminal device 14, the communication unit 37 receives the user information in the power control server 11 (step S73).

In step S74, the CPU 35 records the received user information in the recording unit 36 in association with the device information. Accordingly, for example, the device information of FIG. 6 and the user information of FIG. 8 are recorded in the recording unit 36 in association with each other.

In step S75, the communication unit 37 transmits the user information to the information management server 21 through the network 20. Note that, here, the device information may be transmitted along with the user information.

When the user information is transmitted from the power control server 11, the communication unit 114 receives the user information in the information management server 21 (step 385).

In step S86, the CPU 111 performs user registration processing based on the received user information. For example, as the user registration processing, processing of reading the device information corresponding to the user information from the recording unit 113, and registering the guarantee of the electronic device 13 identified by the identification information included in the device information is performed.

When the processing of step S86 ends, the initial user registration processing of FIG. 7 is terminated. Then, the processing returns to step S16 of FIG. 4, and step S18 and subsequent processing are performed.

As described above, in the initial user registration processing, the user terminal device 14 receives the remote control application of the connected electronic device 13, and executes the remote control application, whereby the input user information is recorded in the power control server 11. Then, the power control server 11 transmits the user information and the device information to the information management server 21, and the information management server 21 performs the user registration processing related to the electronic device 13 identified by the identification information included in the device information based on the received user information.

Next, details of the second and subsequent user registration processing corresponding to step S17 of FIG. 4 will be described with reference to the flowchart of FIG. 9.

Figure 9:
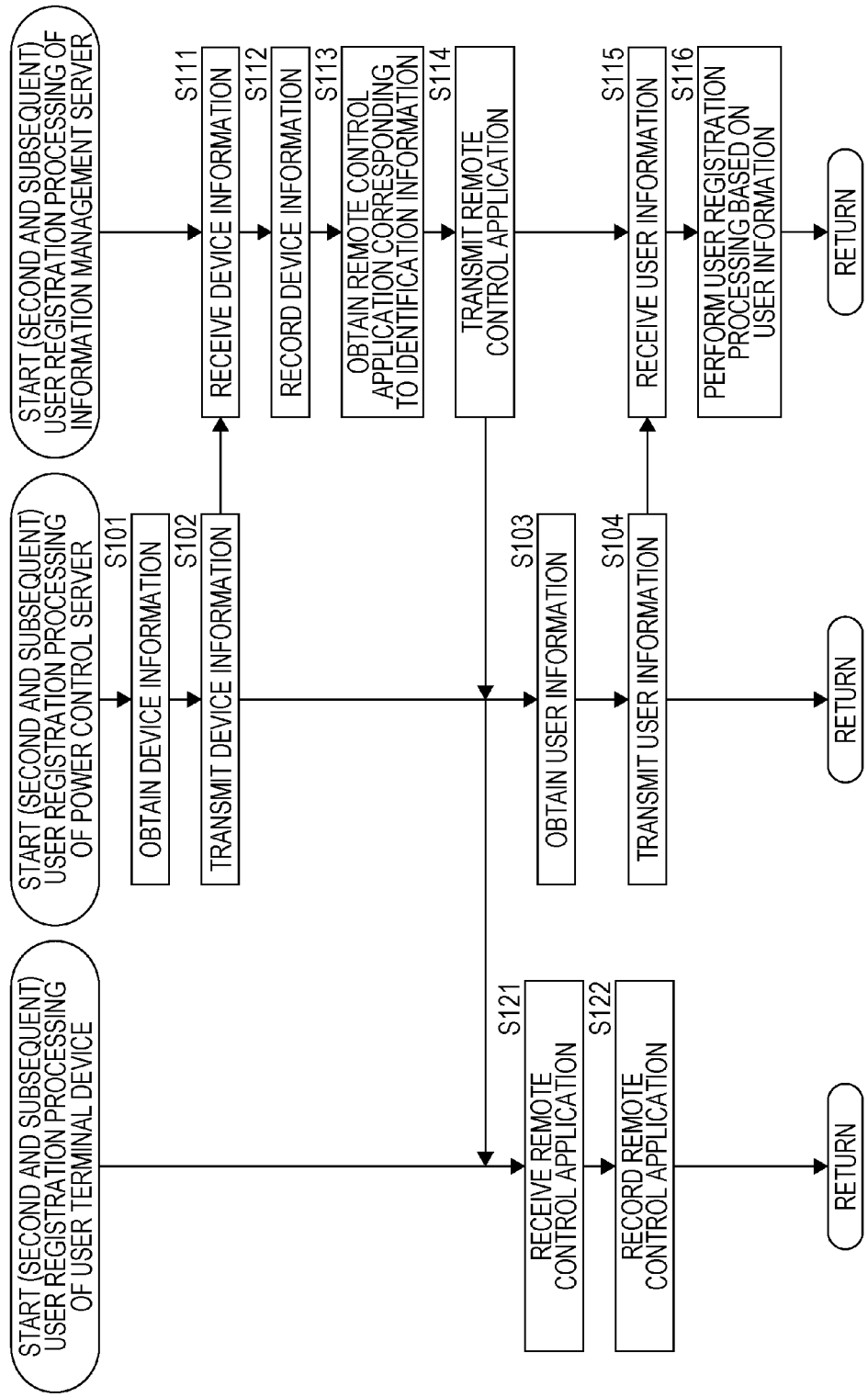
FIG. 9 is a flowchart describing details of second and subsequent user registration processing.

As described above, in a case where a valid electronic device is connected and the electronic device is a newly connected electronic device, when the user information has been recorded in the recording unit 36 of the power control server 11, the second and subsequent user registration processing of FIG. 9 is started.

In steps S101 and S102, similarly to steps S71 and S72 of FIG. 7, the power control server 11 obtains the device information, and transmits the device information to the information management server 21.

In steps S111 to S114, similarly to steps S81 to S84 of FIG. 7, the information management server 21 records the received device information, and transmits the remote control application corresponding to the identification information.

In steps S121 and S122, similarly to steps S91 and S92 of FIG. 7, the user terminal device 14 receives and records the remote control application. Note that, in the second and subsequent user registration processing, the user information has been recorded in the recording unit 36 of the power control server 11 by the initial user registration processing (step S74 of FIG. 7), and therefore, the processing corresponding to steps S93 and S94 of FIG. 7 is not performed.

However, even when the input of the user information is not performed, it is desirable to confirm the user information recorded in the recording unit 36 of the power control server 11 every time a new electronic device 13 is connected.

Then, in the power control server 11, the CPU 35 obtains the user information recorded by the initial user registration processing (step S103), and transmits the user information to the information management server 21 through the network 20 (step S104).

In steps S115 and S116, similarly to steps S85 and S86 of FIG. 7, the user information is received, and the processing of registering the guarantee of the electronic device 13 and the like is performed based on the user information, for example.

When the processing of step S116 ends, the second and subsequent user registration processing of FIG. 9 is terminated. Then, the processing returns to step S17 of FIG. 4, and step S18 and subsequent processing are performed.

As described above, in the second and subsequent user registration processing, the user terminal device 14 receives the remote control application of the connected electronic device 13, but does not perform the input of the user information, and reads out the user information recorded in the power control server 11. Then, the power control server 11 transmits the device information and the user information to the information management server 21, and the information management server 21 performs the user registration processing related to the electronic device 13 identified by the identification information included in the device information based on the received user information.

Note that the information management server 21 may record the user information transmitted from the power control server 11 in the recording unit 113 in association with the device information. Accordingly, in the second and subsequent user registration processing, the information management server 21 can perform the user registration processing by reading out the user information from the recording unit 113 without receiving the user information from the power control server 11. Further, the information management server 21 can provide the user information recorded in the recording unit 113 in response to a request from the user terminal device 14 or the information use terminal device 22.

[A Flow of the Use History Accumulation Processing]

Next, details of the user history accumulation processing corresponding to step S18 of FIG. 4 will be described with reference to the flowchart of FIG. 10.

As described above, the use history accumulation processing is started when the user registration processing ends in a case where an electronic device is a newly connected electronic device 13 or immediately after an electronic device is connected in a case where the electronic device is not a newly connected electronic device 13.

In the power control server 11, the CPU 35 determines whether the power use status is inquired to the electronic device 13 (step S131). In step S131, when it is determined to inquire the power use status, the processing proceeds to step S132.

In step S132, the CPU 35 obtains a power used time and a used power amount of the electronic device 13, and records the information in the recording unit 36 (step S133). For example, the CPU 35 controls the reader/writer 34 to perform communication with the IC chip 55 through the power line, obtains the power amount measured by the power measurement unit 52, and obtains the power used time and the used power amount. Accordingly, so-called intermittent polling is performed by the reader/writer 34, and the power used time and the used power amount are successively recorded in the recording unit 36. In addition, since the power used time and the used power amount can be successively recorded, a graph and the like in which the used power amount is indicated in time series can be provided to the user terminal device 14 in information use processing, for example.

Meanwhile, in step S131, when it is determined not to inquire the power use status, steps S132 and S133 are skipped, and the processing proceeds to step S134.

In step S134, the CPU 35 determines whether the remote control application has been operated. In step S131, when it is determined that the remote control application on has been operated, the processing proceeds to step S135.

In step S135, the CPU 35 obtains information related to the operation of the remote control application, and records the operation information in the recording unit 36 (step S136). For example, the CPU 35 obtains the operation information by controlling the communication unit 37 and performing communication with the user terminal device 14.

Meanwhile, in step S134, when it is determined that the remote control application has not been operated, steps S135 and S136 are skipped, and the processing proceeds to step S137.

Figure 11:
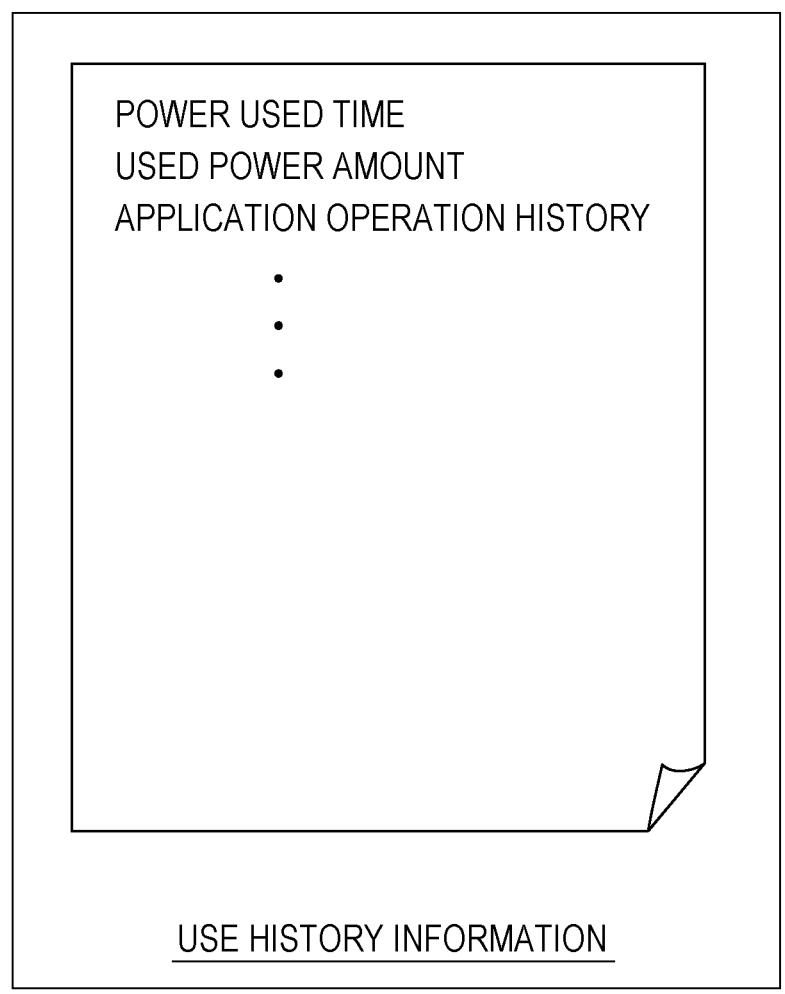
FIG. 11 is a diagram illustrating an example of use history information.

In this way, as illustrated in FIG. 11, the use history information including the power used time and the used power amount of each electronic device 13, the application operation history, and the like is recorded in the recording unit 36 by steps S131 to S136.

Figure 10:
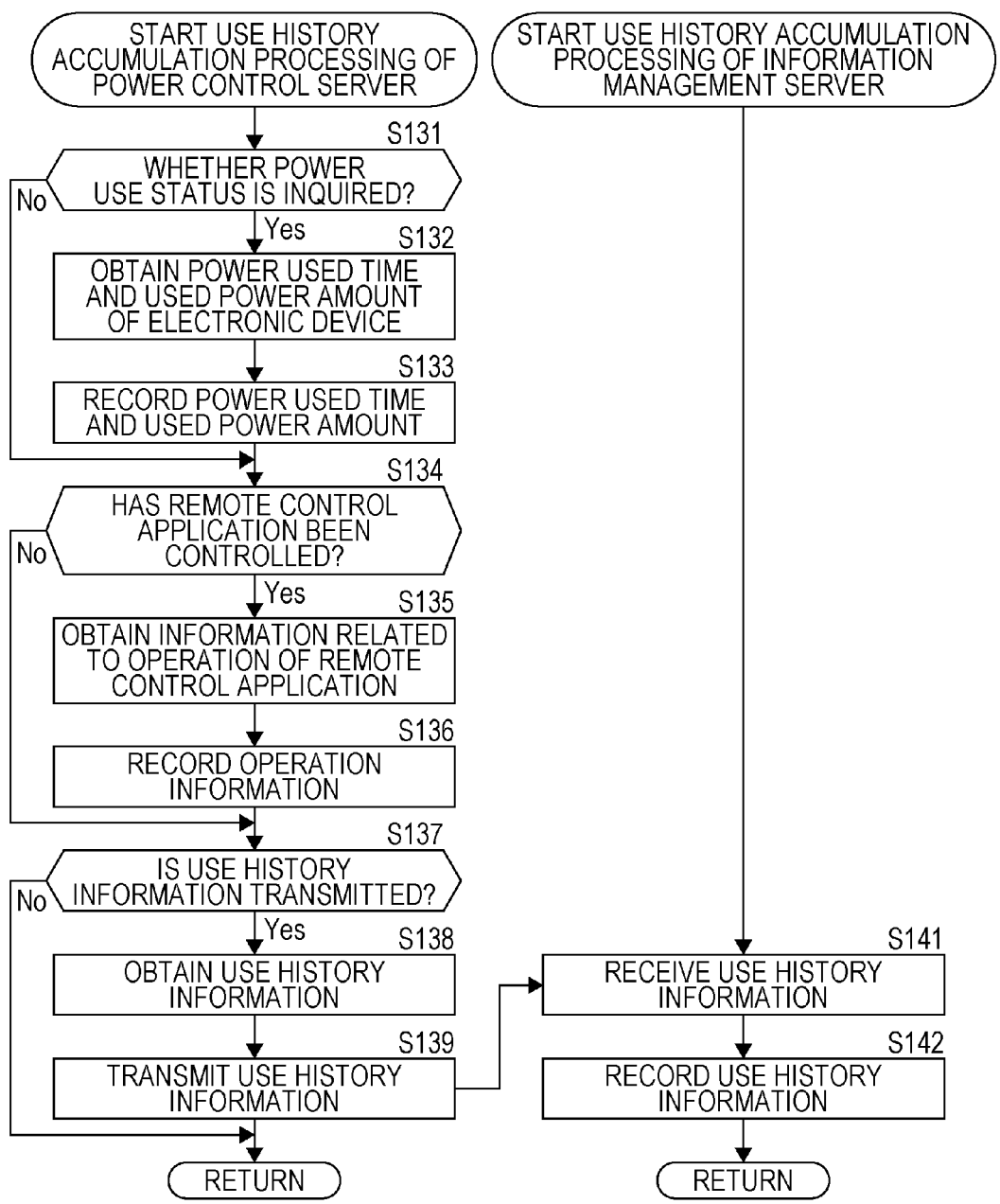
FIG. 10 is a flowchart describing details of use history accumulation processing.

Referring back to the flowchart of FIG. 10, in step S137, the CPU 35 determines whether the use history information recorded in the recording unit 36 is transmitted to the information management server 21. In step S137, when it is determined that the use history information is transmitted based on an instruction from the user or information set in advance, for example, the processing proceeds to step S138.

In step S138, the CPU 35 reads out and obtains the use history information recorded in the recording unit 36. In step S139, the communication unit 37 transmits the obtained use history information and the device information of the electronic device 13, the use history information of which has been obtained, to the information management server 21 through the network 20 according to control of the CPU 35.

When the use history information and the device information are transmitted from the power control server 11, in the information management server 21, the communication unit 114 receives the use history information and the device information (step S141). In step S142, the CPU 111 records the received use history information and device information in the recording unit 113 in association with each other. Accordingly, in the information management server 21, the use history information is accumulated for each electronic device 13.

Meanwhile, in step S137, when it is determined that the use history information is not transmitted, steps S138 and S139 are skipped, and the use history accumulation processing of FIG. 10 ends. Then, the processing returns to step S18 of FIG. 4, and subsequent processing is performed. That is, the use history accumulation processing of step S18 is repeated until, the use of the electronic device 13 is determined to be terminated ("Yes" of step S19 of FIG. 4), and the use history information is accumulated in the information management server 21.

As described above, in the use history accumulation processing, the use history information of the electronic device 13 is obtained by the power control server 11, and is transmitted to the information management server 21. Accordingly, the use history information is accumulated in the information management server 21.

[A Flow of Information Use Processing]

Next, details of the information use processing corresponding to step S21 of FIG. 4 will be described with reference to the flowcharts of FIGS. 12 and 13.

Figure 12:
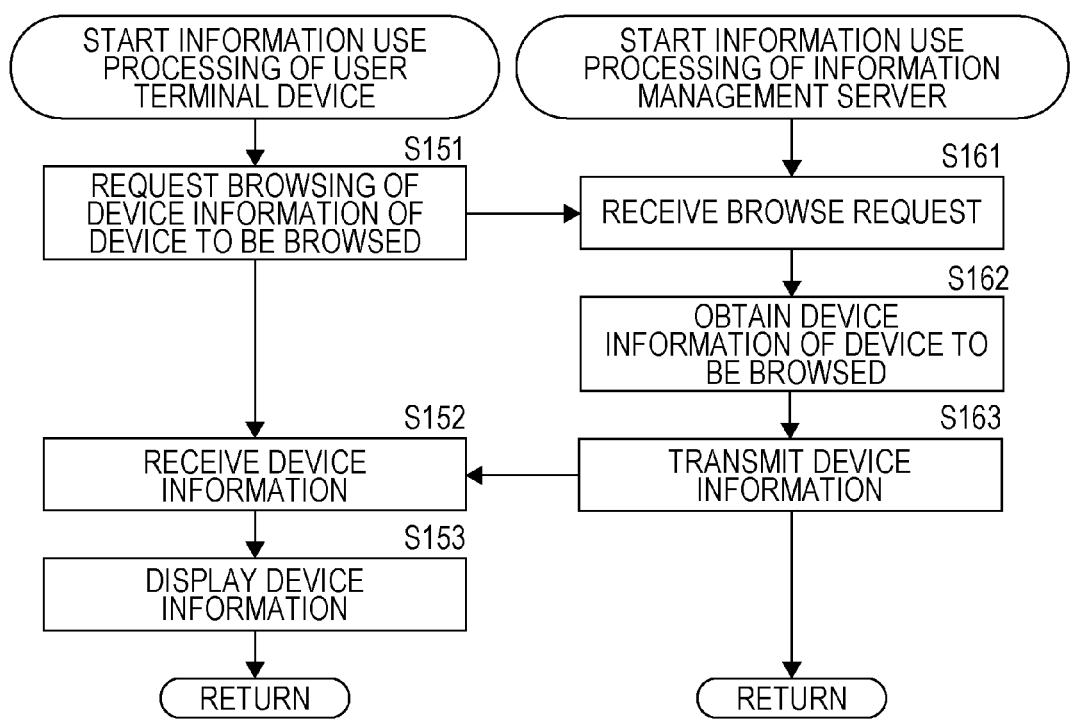
FIG. 12 is a flowchart describing details of information use processing.
Figure 13:
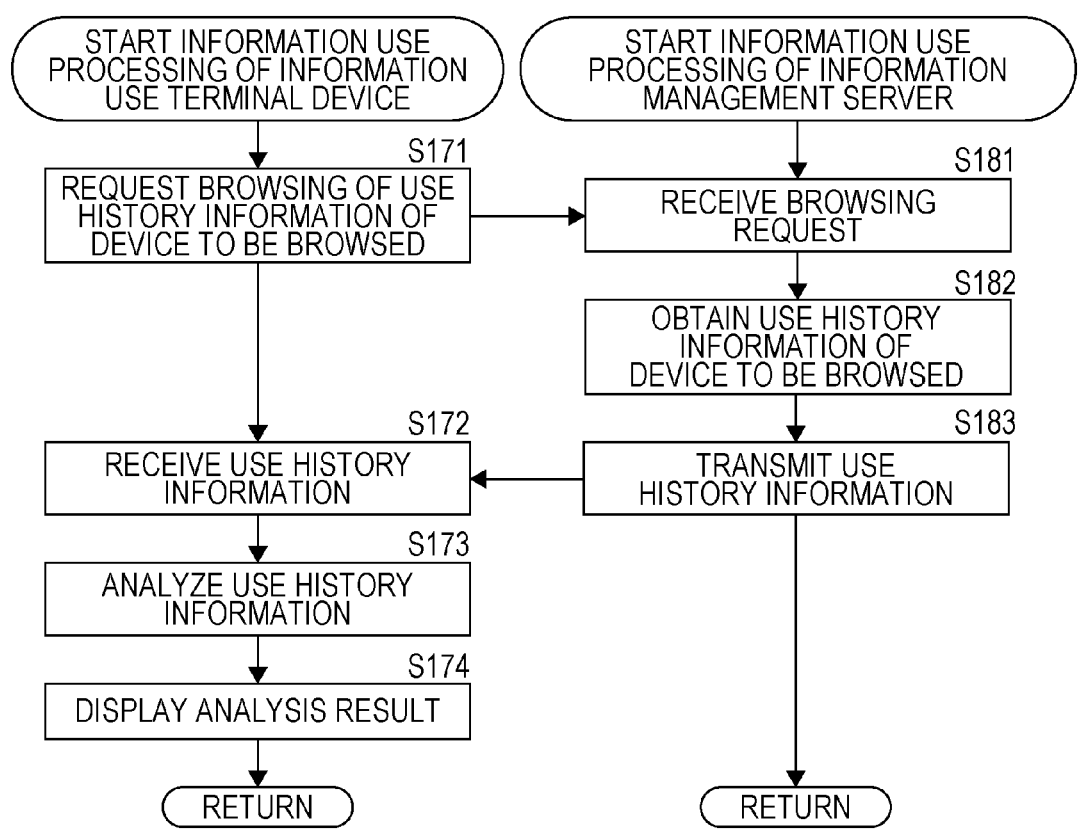
FIG. 13 is a flowchart describing details of the information use processing.

As described, above, when the information accumulated in the information management server 21 is used, the information use processing of FIGS. 12 and 13 is started in the user terminal device 14 or in the information use terminal device 22.

First, the information use processing performed by the user terminal device 14 will be described with reference to the flowchart of FIG. 12.

In the user terminal device 14, the communication unit 94 transmits a browsing request of the device information of an electronic device 13 to be browsed to the information management server 21 through the network 20 according to control of the CPU 91 (step S151).

When the browsing request is transmitted from the user terminal device 14, the communication unit 114 receives the browsing request transmitted from the user terminal device 14 in the information management server 21 (step S161).

In step S162, the CPU 111 reads out and obtains the device information of the electronic device 13 to be browsed from the recording unit 113 based on the received browsing request. The electronic device 13 to be browsed is identified by the identification information included in the device information, for example.

In step S163, the communication unit 114 transmits the obtained device information to the user terminal device 14 through the network 20.

When the device information is transmitted from the information management server 21, in the user terminal device 14, the communication unit 94 receives the device information transmitted from the information management server 21 (step S152). In step S153, the CPU 91 displays the received device information in the display unit 95.

Accordingly, the user can confirm the device information of the electronic device 13 that the user owns. Note that, in the information use processing of FIG. 12, browsing of the device information has been described as an example. However, it is possible to browse information related to the own user information and the guarantee accumulated in the information management server 21, for example. For example, when the electronic device 13 breaks down, information of the guarantee of the electronic device 13 can be confirmed, and the breakdown can be promptly handled by an access to support information of the manufacturer and the shop. In addition, the user can promptly get an operation manual as needed, by registering the operation manual of the remote control application and the electronic device 13 in the information management server 21 in advance.

When the processing of step S153 ends, the information use processing performed by the user terminal device 14 of FIG. 12 is terminated. Then, the processing returns to step S21 of FIG. 4, and subsequent processing is performed.

As described above, in the information use processing by the user terminal device 14, the information management server 21 provides information such as the device information in response to the request from the user terminal device 14.

Accordingly, the user terminal device 14 displays the information such as the device information, and enables the user to confirm the information.

Note that, in the information use processing of FIG. 12, an example in which the information management server 21 provides the information in response to the request from the user terminal device 14 has been described. However, the power control server 11 can provide the recorded device information and the user information in response to the request from the user terminal device 14 in a similar manner.

Next, the information use processing performed by the information use terminal device 22 will be described with reference to the flowchart of FIG. 13.

In the information use terminal device 22, the communication unit 134 transmits a browsing request of the use history information of the electronic device 13 to be browsed to the information management server 21 through the network 20 according to control of the CPU 131 (step S171).

When the browsing request is transmitted from the information use terminal device 22, in the information management server 21, the communication unit 114 receives the browsing request transmitted from the information use terminal device 22 (step S181).

In step S182, the CPU 111 reads out and obtains the use history information of the electronic device 13 to be browsed from the recording unit 113 based on the received browsing request. The electronic device 13 to be browsed is identified by the identification information included in the device information, for example.

In step S183, the communication unit 114 transmits the obtained use history information to the information use terminal device 22 through the network 20.

When the use history information is transmitted from the information management server 21, in the information use terminal device 22, the communication unit 134 receives the use history information transmitted from the information management server 21 (step S172).

In step S173, the CPU 91 analyzes the received use history information, and displays an analysis result in the display unit 95 (step S174).

As the analysis processing, analysis processing for holding details of the use status about the electronic device 13 that involves the business operator who use information is performed based on the power used time the used power amount, the application operation history, and the like. The business operator who use information can grasp and predict the breakdown and depreciation of the electronic device 13 using the analysis result and notify the user thereof, or can offer a sale of a consumable supplies and a new substitute.

When the processing of step S174 ends, the information use processing performed by the information use terminal device 22 of FIG. 13 is terminated. Then, the processing returns to step S21 of FIG. 4, and subsequent processing is performed.

As described above, in the information use processing by the information use terminal device 22, the information management server 21 provides the use history information in response to the request from the information use terminal device 22. Then, useful information for the business operator who use information can be obtained by the analysis of the use history information.

In this way, by registering the own user information only once by operating the user terminal device 14 in performing the user registration of the electronic device 13, the user can complete the following user registration by simply connecting a new electronic device 13. As a result, it is not necessary to send the guarantee by mail and the like, whereby the user registration can be easily performed.

Further, since the use history information of the electronic device 13 is collected, after the user purchases a product and performs the user registration, the distributor such as the manufacturer and the shop can indirectly get the use history information of the product from the information management server 21 provided by the business operator who provides information. In addition, the manufacturer or the distributor may install a dedicated server and can directly collect the use history information through the network 20. Accordingly, the manufacturer and the like can obtain the information including when, where, and how the consumers use the product manufactured by the manufacturer. Then, it becomes possible to conduct an advertisement to the individual users in accordance with an expected product life and the like using the information. In addition, after the product is sold, the possibility of the user registration to be performed when the user starts the use of the product becomes higher, and therefore, the manufacturer and the like can hold the term of guarantee of the product more accurately. Previously, there were many cases that the user does not perform user registration after purchase of a product, and thus, there is a limited method of obtaining working information of own company's products and of products distributed by the company. However, the manufacturer and the distributor can easily obtain the working information by the easy user registration by the present technology.

Further, when the electronic device 13 breaks down, for example, the user can browse information related to the guarantee and the like by operating the user terminal device 14 to be connected to the information management server 21, whereby effort to search for a purchase guarantee, to check the contact information, and the like can be saved.

Note that, in the above-described description, an example has been described, as illustrated in the left drawing of FIG. 14, in which the electronic device 13 is provided with the IC chip 75 and the identification information is stored in the IC chip 75. However, the identification information can be stored in the IC chip 201 by providing the IC chip 201 to the power plug adapter 15 that is connected to the power tap 12, as illustrated in the right drawing of FIG. 14. Accordingly, when the electronic device 13 is connected to the power tap 12 through the power plug adapter 15, the power control server 11 reads out the identification information stored in the IC chip 201 of the power plug adapter 15, and performs the authentication processing. Therefore, even the electronic device 13 that does not hold the identification information can be authenticated.

Further, in the above-described description, an example has been described, in which the information transmitted from the power control server 11 is accumulated in the information management server 21, and the information is provided to the information use terminal device 22. However, the connected electronic device 13 may be controlled such that the information management server 21 controls the power control server 11 in response to an instruction from the information use terminal device 22 or the user terminal device 14. Accordingly, for example, an employee of a power company operates the information use terminal device 22 and connects to the information management server 21, so that the setting temperature of air conditioners administered by the company can be changed all together, and the power to the electronic devices that belong to a nonessential and non-urgent category can be interrupted. In addition, the user outside operates the user terminal device 14 and connects to the information management server 21, so that the electronic device 13 in the home can be controlled.

Note that the system in the present specification refers to the entire device configured from, a plurality of devices.

Embodiments of the present technology are not limited to the above-described embodiments, and various modifications are possible without departing from the scope and gist of the present technology.

The present technology may employ the following configurations.

[1]
A power supply control device including:
a power source supply unit configured to output power through a power line;
a communication unit configured to output a high-frequency signal and to communicate with an electronic device to which the power is output, through the power line, to read out device information including at least identification information identifying she electronic device;
a control unit configured to obtain user information related to a user who uses the electronic device; and
a transmission unit configured to transmit she obtained user information and the read out device information to an information management device configured to manage the device information.

[2]
The power supply control device according to [1], further including a recording unit configured to record the user information,
wherein, when the user information has not been recorded in she recording unit, the control unit obtains the user information input by the user, and when the use information has been recorded in the recording unit, the control unit obtains the recorded user information.

[3]
The power supply control device according to [1] or [2],
wherein the control unit performs authentication processing of the electronic device based on the identification information included in the read out device information, and controls the power to be output to the electronic device through the power line in accordance with a result of the authentication processing.

[4]
The power supply control device according to any of [1] to [3],
wherein the communication unit outputs the high-frequency signal and to perform communication through the power line to obtain use history information related to a use status of the electronic device, and
the transmission unit transmits the obtained use history information and the device information to the information management device.

[5]
The power supply control device according to [4],
wherein the communication unit obtains a power used time and a used power amount of the electronic device as the use history information.

[6]
The power supply control device according to any of [1] to [5],
wherein the electronic device is provided with a storage element configured to output the stored device information to the power supply control device through the power line by applying load modulation to the high-frequency signal input through the power line.

[7]
A control method in which a power supply control device including the steps of:
outputting power through a power line;
outputting a high-frequency signal and communicating with an electronic device to which the power is output, through the power line, and reading out device information including at least identification information identifying the electronic device;
obtaining user information related to a user who uses the electronic, device; and transmitting the obtained user information and the read out device information to an information management device configured to manage the device information.

[8]

A power supply control system including:
an electronic device;
a power supply control device;
an information management device; and
a terminal device,
wherein the power supply control device includes
a power source supply unit configured to output power through a power line,
a communication unit configured to output a high-frequency signal and to communicate with the electronic device to which the power is output, through the power line, and to read out device information including at least identification information identifying she electronic device,
a control unit configured to obtain user information related to a user who uses the electronic device, and
a transmission unit configured to transmit she obtained user information and the read out device information to the information management device, and
the information management device includes
a reception unit configured to receive the user information and the device information transmitted from the power supply control device, and
a processing unit configured to perform user registration processing related to the electronic device identified by the identification information included in the device information based on the received user information.

[9]

The power supply control system according to [8],
wherein she information management device further includes
a recording unit configured to record the received device information, and
the processing unit performs processing of providing the recorded device information in response to a request from the terminal device.

[10]

The power supply control system according to [9]
wherein the communication unit outputs the high-frequency signal and perform communication through the power line to obtain use history information related to a use status of the electronic device,
the transmission unit transmits the obtained use history information and the device information to the information management device,
the reception unit receives the use history information and the device information transmitted from the power supply control device, and
the recording unit records the received use history information and the device information in association with each other.

[11]

The power supply control system according to [10],
wherein the communication unit obtains a power used time and a used power amount of the electronic device as the use history information.

[12]

The power supply control system according to [10] or
wherein the processing unit performs processing of providing the recorded use history information in response to a request from the terminal device.

[13]

The power supply control system according to any of [8] to [12],
wherein the electronic device is provided with a storage element configured to apply load modulation to the high-frequency signal input, through the power line to output the stored device information to the power supply control device through the power line.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 Power supply control system
11 Power control server
12 Power source tap
13 Electronic device
14 User terminal device
15 Power plug adapter
20 Network
21 Information management server
22 Information use terminal device
34 Reader/writer
35 CPU
36 Recording unit
37 Communication unit
111 CPU
113 Recording unit
114 Communication unit

The invention claimed is:

1. A power supply control device comprising:
a power source supply unit configured to output alternating current (AC) power through a power line;
a communication unit configured to output a high-frequency signal and to communicate with an electronic device to which the AC power is output, through the power line, to read out device information including at least identification information identifying the electronic device, wherein the frequency of the high frequency signal is higher than the frequency of the AC power;
a control unit configured to obtain user information related to a user who uses the electronic device; and
a transmission unit configured to transmit the obtained user information and the device information to an information management device.

2. The power supply control device according to claim 1, further comprising a recording unit configured to record the user information, wherein, in an event the user information has not been recorded in the recording unit, the control unit is configured to obtain the user information input by the user, and in an event the user information has been recorded in the recording unit, the control unit is configured to obtain the recorded user information.

3. The power supply control device according to claim 1, wherein the control unit is configured to perform authentication processing of the electronic device based on the identification information included in the read out device information, and control the AC power to be output to the electronic device through the power line in accordance with a result of the authentication processing.

4. The power supply control device according to claim 1, wherein the communication unit is configured to output the high-frequency signal and to perform communication through the power line to obtain use history information related to a use status of the electronic device, and
wherein the transmission unit is configured to transmit the obtained use history information and the device information to the information management device.

5. The power supply control device according to claim 4, wherein the communication unit is configured to obtain a power used time and a used power amount of the electronic device as the use history information.

6. The power supply control device according to claim 1, wherein the electronic device includes a storage element configured to output the stored device information to the power supply control device through the power line by applying load modulation to the high-frequency signal input through the power line.

7. A control method in which a power supply control device comprising the steps of:
outputting alternating current (AC) power through a power line;
outputting a high-frequency signal and communicating with an electronic device to which the AC power is output, through the power line, and reading out device information including at least identification information identifying the electronic device, wherein the frequency of the high frequency signal is higher than the frequency of the AC power;
obtaining user information related to a user who uses the electronic device; and
transmitting the obtained user information and the read out device information to an information management device.

8. A power supply control system comprising:
an electronic device;
a power supply control device;
an information management device; and
a terminal device,
wherein the power supply control device includes
a power source supply unit configured to output alternating current (AC) power through a power line,
a communication unit configured to output a high-frequency signal and to communicate with the electronic device to which the AC power is output, through the power line, and to read out device information including at least identification information identifying the electronic device, wherein the frequency of the high frequency signal is higher than the frequency of the AC power,
a control unit configured to obtain user information related to a user who uses the electronic device, and
a transmission unit configured to transmit the obtained user information and the read out device information to the information management device, wherein the information management device includes
a reception unit configured to receive the user information and the device information transmitted from the power supply control device, and
a processing unit configured to perform user registration processing related to the electronic device identified by the identification information included in the device information based on the received user information.

9. The power supply control system according to claim 8, wherein the information management device further includes
a recording unit configured to record the received device information, and
wherein the processing unit is configured to perform processing of providing the recorded device information in response to a request from the terminal device.

10. The power supply control system according to claim 9,
wherein the communication unit is configured to output the high-frequency signal and perform communication through the power line to obtain use history information related to a use status of the electronic device,
the transmission unit is configured to transmit the obtained use history information and the device information to the information management device,
the reception unit is configured to receive the use history information and the device information transmitted from the power supply control device, and
the recording unit is configured to record the received use history information and the device information in association with each other.

11. The power supply control system according to claim 10, wherein the communication unit is configured to obtain a power used time and a used power amount of the electronic device as the use history information.

12. The power supply control system according to claim 10, wherein the processing unit is configured to perform processing of providing the recorded use history information in response to a request from the terminal device.

13. The power supply control system according to claim 8, wherein the electronic device includes a storage element configured to apply load modulation to the high-frequency signal input through the power line to output the stored device information to the power supply control device through the power line.

14. The power supply control device according to claim 1, wherein the high-frequency signal includes 13.56 MHz.

15. The power supply control device according to claim 1, further comprising a high-pass filter, wherein the high-pass filter is configured to pass the high-frequency signal through the power line.

16. The power supply control device according to claim 1, wherein the high frequency signal is superimposed on the AC power output through the power line.

17. The power supply control device according to claim 3, wherein the control unit is configured to determine whether the electronic device, that has been authenticated, is a newly connected electronic device.

18. The power supply control device according to claim 17, wherein in an event, the control unit determines that the electronic device is the newly connected electronic device, the information management device is configured to perform user registration.

19. The power supply control device according to claim 3, wherein in an event, the control unit determines that the electronic device is not authenticated, the control unit is configured to perform connection confirmation of the electronic device with the user.

* * * * *